(12) United States Patent
Loheide et al.

(10) Patent No.: US 7,669,700 B2
(45) Date of Patent: Mar. 2, 2010

(54) ELASTOMER BEARING WITH HYDRAULIC DAMPING

(75) Inventors: Stefan Loheide, Wallenhorst (DE); Hubert Siemer, Dinklage (DE); Burkhard Meyer, Dinklage (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 323 days.

(21) Appl. No.: 11/696,235

(22) Filed: Apr. 4, 2007

(65) Prior Publication Data
US 2007/0246872 A1    Oct. 25, 2007

(30) Foreign Application Priority Data
Apr. 20, 2006   (DE)   .................. 10 2006 018 764

(51) Int. Cl.
*F16F 9/53* (2006.01)
(52) U.S. Cl. .................. 188/267.2; 267/140.15
(58) Field of Classification Search ........... 188/267.1, 188/267.2; 267/140.14, 140.15
See application file for complete search history.

(56) References Cited

U.S. PATENT DOCUMENTS

| | | | | |
|---|---|---|---|---|
| 5,398,917 A | * | 3/1995 | Carlson et al. | 267/140.14 |
| 6,152,272 A | * | 11/2000 | Agnihotri et al. | 188/267.2 |
| 6,896,109 B2 | * | 5/2005 | Kelso et al. | 188/267.1 |

FOREIGN PATENT DOCUMENTS

DE    103 29 982    1/2005

* cited by examiner

*Primary Examiner*—Melanie Torres
(74) *Attorney, Agent, or Firm*—Norris McLaughlin & Marcus, PA; Christa Hildebrand, Esq.

(57) ABSTRACT

An elastomer bearing with hydraulic damping is disclosed which includes a housing (1, 2), a connecting element (3), an elastomer body (4) which couples the housing (1, 2) and the connecting element (3) with one another for damping oscillations, two chambers (5, 6) filled with a magneto-rheological fluid, at least one flow channel (8) connecting the chambers (5, 6) with one another for fluid conduction, as well as an actuator (11) associated with the flow channel and attached on the outside of the housing (1, 2) for generating a magnetic field. According to the invention, a field return element (10) with interacts with the actuator is arranged on or in the flow channel (8).

28 Claims, 4 Drawing Sheets

ELASTOMER BEARING WITH HYDRAULIC DAMPING

BACKGROUND OF THE INVENTION

1. Field of the Invention

The invention relates to an elastomer bearing with hydraulic damping including a housing, a connecting element, an elastomer body which couples the housing and the connecting element with one another for damping oscillations, two chambers filled with a magneto-rheological fluid, a flow channel which connects the chambers with one another for fluid conduction, an actuator associated with the flow channel and mounted on the outside of the housing for generating a magnetic field.

2. Description of the Related Art

With increasing desire for comfort, damping of vibrations generated internally in an automobile and/or of externally introduced vibrations, which are transmitted for example from the road surface to the vehicle, becomes more and more of an issue. This is particularly important for reducing the noise level in the vehicle interior and reducing vibrations perceived as annoying. Elastomer bearings are used increasingly because of the advantageous resilient and damping properties of materials, for example for supporting the engine or moving parts in the automobile. The specific geometry and the composition of the elastomer has a major impact on the quality and the damping properties. The firmness and elasticity of the elastomer bearing can thus be significantly affected by changing the material composition of the elastomer. However, this variability has limits where large vibration amplitudes have to be damped. These are produced, for example, when the engine is idling or when a periodic or impulse motion is transferred to the chassis on an uneven road surface. In these situations, elastomer bearings with hydraulic damping are increasingly employed in automobiles.

These elastomer bearings have at least two mutually independent chambers containing a damping fluid. The chambers are connected with one another via a flow channel and are deformed by an external force applied to the elastomer bearing, so that damping fluid can flow from one chamber into the other.

The chamber walls resist the change in the shape, and the resistance causes a pressure change in the chambers. A measure for this pressure change caused by the produced volume displacement is referred to as "buckling spring rate." To equalize the pressure difference between the chambers, the chambers are connected via the aforementioned flow channel. During spring deflection at low frequencies, the pressure between the chambers is equalized exclusively via the flow channel. The elastomer body hereby significantly contributes to the spring characteristic and the damping characteristic of the elastomer bearing. However, a damped system capable of performing oscillations becomes more and more important at higher frequencies, wherein the damped system consists of the elastic chamber walls and the mass of the damping fluid located in the flow channel. The various contributions to the total damping effect of the elastomer bearing are, on one hand, the internal friction of the damping fluid in the channel and, on the other hand, the losses from the dynamic pressure.

When an elastomer bearing with hydraulic damping is excited in the range of a resonance frequency, the damping changes, which causes the overall elastic characteristic of the elastomer bearing to change. Above the resonance frequency, the inertia of the fluid quantity in the flow channel and the friction prevent a further pressure equalization between the chambers. The stiffness of the chamber walls then supports the stiffness of the mount and causes an increase in the total stiffness compared to the low-frequency load condition.

A hydraulically damped elastomer bearing composed of a housing and a connecting element is known from DE 103 29 982 B4. The housing and connecting element are coupled with one another via an elastomer body to dampen vibrations. The elastomer bearing also has two chambers filled with a magneto-rheological fluid. These chambers are connected with one another for fluid conduction via a flow channel. An actuator mounted on the outside of the housing is associated with the flow channel, with the actuator generating a magnetic field that is applied to the magneto-rheological fluid. The actuator is an electromagnet which generates an electromagnetic field with curved field lines extending between the poles. The field strength decreases with the distance from the electromagnet, so that with conventional solution is incapable of producing a uniform change of the properties of the magneto-rheological fluid inside the flow channel.

SUMMARY OF THE INVENTION

It is therefore an object of the invention to provide an elastomer bearing with hydraulic damping which allows a switchable, fatigue-proof and noise-free, as well as secure closure of the flow channel even during very short time periods. The elastomer bearing should also be easy to install and have lower manufacturing costs.

The object is solved by providing an elastomer bearing with hydraulic damping, including a housing, a connecting element, an elastomer body which couples the housing and the connecting element with one another for damping oscillations, two chambers filled with a magneto-rheological fluid, at least one flow channel which connects the chambers with one another for fluid conduction, an actuator associated with the flow channel and mounted on the outside of the housing for generating a magnetic field. The flow channel has a field return element which interacts with the actuator. Further, the field return element is inserted in the flow channel or forms a portion of the flow channel. The field return element may include at least one stud. The field return element may also have a surface with several studs. The housing has an opening in the region where the actuator is arranged. Each stud contacts the housing in a marginal region of the opening of the housing. The opening has a geometric dimension which is of the same size as or is greater than the outside dimension of the effective region of the actuator. The actuator may be arranged at a location on the housing which is associated with the flow channel. A membrane made of a non-magnetic material is inserted in the opening. The membrane may be made of an elastomer material. An insert may be embedded in the membrane. The insert is made of a magnetic material. The insert is shaped like a plate. The insert is connected with the membrane by a material connection. Further, the insert and the membrane are glued together or are connected with one another by a vulcanization process. The elastic membrane is connected with the housing by a material connection. The membrane is glued into the opening or connected with the housing by a vulcanization process. The elastic membrane is non-positively connected with the housing. The housing comprises an exterior part and an interior part, and the edge of the membrane is clamped between the inner part and the outer part. The actuator is an electromagnet and ma be formed as a magnetic clamp. The yoke of the electromagnet is coupled with the insert. The flow channel is implemented as a bypass channel for at least one open damping channel which connects the chambers for fluid conduction. The damping channel has a smaller cross-section and a greater length than the flow channel. The elastomer bearing is formed as a bush bearing. The elastomer bearing may be inserted with its housing into a corresponding receiving opening of an automobile component.

In more detail, the elastomer bearing with hydraulic damping with a housing, a connecting element, an elastomer body which couples the housing and the connecting element with one another for damping oscillations, as well as two chamber filled with a magneto-rheological fluid, at least one flow channel which connects the chambers with one another for fluid conduction, and an actuator associated with the flow channel and mounted on the outside of the housing for generating a magnetic field is modified further in that the flow channel has a field return element that interacts with the actuator.

With an elastomer bearing with hydraulic damping according to the invention, no noise is generated when the flow characteristic within the flow channel changes, because movable components or assemblies are eliminated. Wear of mechanical components is also eliminated.

According to a particular advantage of the invention, the field return element provides efficient guiding of the magnetic field and is capable of minimizing the magnetic resistance.

Extremely short switching times can be realized depending on the employed actuator, so that the properties of the elastomer bearing with hydraulic damping can be adjusted dynamically and in real time. The employed electronics is very simple and therefore also cost-effective. With the selected configuration, the required switching power can be significantly reduced compared to conventional solutions. The invention therefore represents a very flexible solution.

Accordingly, a wear-free modular elastomer bearing is provided, wherein the housing and the actuator can be manufactured separately and the actuator can be mounted on the housing of the elastomer bearing from the outside. The simple construction of the invention therefore allows a cost-effective manufacture of the elastomer bearing.

According to an advantageous embodiment of the invention, the field return element may be inserted in the flow channel or may form a portion of the flow channel. A separately insertable field return element in the flow chamber may advantageously meet the desire for a modular construction of the bearing. Depending on the required or desired parameters, differently sized field return elements can be employed within the flow channel.

To ensure unimpeded flow of the magneto-rheological fluid inside the flow channel, it is also proposed that the field return element includes at least one stud. The stud represents a coupling for orienting the magnetic field, thereby preventing magnetic leakage. Because the magnetic field is uniform, the switching process of the elastomer bearing with hydraulic damping formed in this way can be precisely defined and adjusted.

Advantageously, the field return element may have a surface with several studs. This modification of the invention increases the strength of the generated field and therefore also improves control of the magneto-rheological fluid inside the flow channel.

Because the housing of an elastomer bearing with hydraulic damping according to the invention can be at least partially made of a metal and more particularly of a soft-magnetic material, is advantageous to provide an opening in the region of the housing where the actuator is arranged, so as to prevent the housing from affecting the actuator. The opening can have a geometric dimension equal to or greater than the outside dimension of the effective range of the actuator.

Preferably, for optimally guiding the field, each of the studs disposed on the field return element should be arranged in the edge region of the opening of the housing and be in contact with the housing.

The magnetic field can be particularly effectively influenced by placing the actuator at a location on the housing that is associated with the flow channel, i.e., the actuator may be arranged in the immediate vicinity of the flow channel.

In any event, the opening is provided for receiving a membrane made of a non-magnetic material. Examples for such materials are, for example, plastics or elastomer materials.

According to another embodiment of the invention, a metallic, preferably soft-magnetic insert is embedded in the membrane to optimize cooperation with an actuator implemented as an electromagnet.

One consequence of placing the insert inside the membrane is to close the field produced by the actuator.

When the actuator is implemented as an electromagnet, a magnetic circuit is formed which consists of the electromagnet, the insert, the flow channel with the magneto-rheological fluid enclosed therein, as well as the field return element having the studs.

For precisely guiding the magnetic field, the insert is preferably formed as a plate, which can advantageously easily manufacture and readily connected with the membrane receiving the insert.

Extreme load situations capable of generating a high pressure inside the elastomer bearing or the chambers may cause problems with the seals. It is therefore proposed to materially connect the insert with the membrane.

A material connection hereby indicates more particularly an adhesive connection or a vulcanization process which transforms the insert with the membrane into a single-piece, materially connected component, which can be easily manufactured.

The aforedescribed problem associated with sealing the elastomer bearing with hydraulic damping according to the invention to the outside can be improved according to another modification of the invention by materially connecting the elastic membrane with the housing. The aforedescribed material connection assumes that the membrane is, for example, glued in the opening of the housing or connected with the housing by a vulcanization process. This arrangement reliably seals the elastomer bearing.

According to another solution, the membrane may be non-positively connected with the housing instead of by a material connection. One example for a non-positive connection may be a clamping connection whereby, for example, the housing may by made of several parts, for example of an outer part and an inner part, and the edge of the membrane may be clamped between the inner part and the outer part. Such approach can significantly simplify production of the elastomer bearing according to the invention by eliminating the energy-intensive vulcanization process. The illustrated clamping connection is capable of reliably and optimally sealing the elastomer bearing.

If actuator is in form of an electromagnet, the present invention can particularly advantageously be implemented by employing a magnetic clamp. With this approach, moving components can advantageously be eliminated and the magnet can produce a uniform magnetic field.

Preferably, the yoke of this type of electromagnet is coupled with the insert, so that these components are connected with one another. Advantageously, the insert can here also be fabricated of a magnetic material.

As already known from conventional solutions, with the embodiment of the present invention several flow channels can be arranged within the elastomer bearing having hydraulic damping, depending on the intended application. For example, the flow channel may be implemented as a bypass channel to another unsealed damping channel that connects the chambers for flow conduction. In this type of elastomer bearing, damping is primarily achieved via the damping channel that is always open. The bypass channel is switched in or switched out only as needed. This is possible with the actuator which has extremely short switching times, so that the bearing can be selectively controlled and the properties of the supported components can be influenced accordingly. Real-time switching can be implemented with the solution according to the invention.

According to further advantageous embodiments of the invention, the aforementioned damping channel may, for example, have a smaller cross-section than the flow channel and may be longer than the flow channel.

The elastomer bearing according to the invention with hydraulic damping can be used as engine mount for mounting the engine of an automobile, as well as a so-called "bush bearing." Bush bearings are used, for example, for supporting chassis steering components or auxiliary frames, so as to dampen vibrations transmitted from the road surface to the vehicle wheel. The present invention can also be applied in other areas which, however, cannot be recited here in their entirety.

Connecting elements are generally provided as connection between the elastomer bearing with hydraulic damping of the invention and the automobile. Alternatively, the housing of the elastomer bearing can also be inserted directly in a corresponding receiving opening of an automobile part. The housing can be partially or completely inserted into the corresponding receiving opening.

The invention will be described hereinafter in more detail with reference to the appended drawings. The illustrated exemplary embodiment, however, does not limit the invention to the illustrated embodiment, by is only intended to describe a principle of the invention. Identical or substantially similar components are indicated with the same reference numerals. To illustrate the operation according to the invention, only simplified schematic diagrams are shown in the figures, whereby components that are not important for the invention have been omitted. However, this does not imply that such components are absent in a solution according to the invention.

BRIEF DESCRIPTION OF THE DRAWINGS

In the drawings, wherein like reference numerals delineate similar elements throughout the several views.

It is shown in.

DETAILED DESCRIPTION OF THE PRESENTLY PREFERRED EMBODIMENTS

Figure 1:
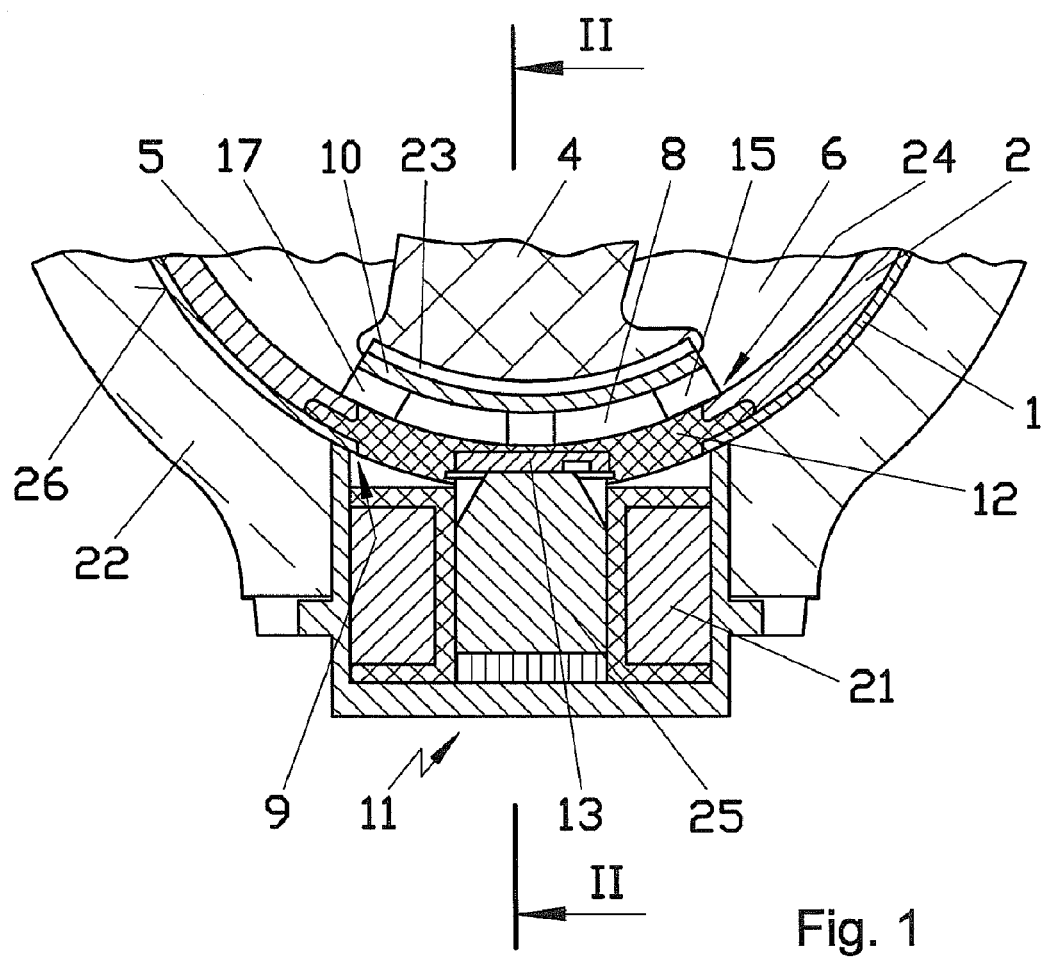
FIG. 1 a partial cross-sectional view of an elastomer bearing with hydraulic damping according to the invention, FIG. 2 a partial view taken along the line II-II of FIG. 1, FIG. 3 a field return element shown as an individual part, and FIG. 4 a perspective view of an elastomer bearing with hydraulic damping inserted in an automobile component.

The elastomer bearing with hydraulic damping, which is only partially illustrated in FIG. 1, has a two-part housing 1, 2 consisting of an outer part 1 and an inner part 2. An elastomer body 4 provides a connection to a connecting element 3 which is not shown in FIG. 1. Due to the elastic properties of the elastomer body 4, the connection between the connecting element 3 and the housing 1, 2 dampens vibrations of the components that move relative to one another, namely the connecting element 3 and housing 1, 2. The elastomer bearing also includes two chambers 5 and 6 which are filled with a magneto-rheological fluid. A flow channel 8 connects the chambers 5 and 6. In the illustrated exemplary embodiment of an elastomer bearing with hydraulic damping, the flow characteristic of the magneto-rheological fluid can affected by the actuator 11 arranged on the outside of housing 1, 2. The actuator 11 is hereby implemented as an electromagnet in form of a magnetic clamp, with a yoke 25 and a coil 21 arranged around the yoke 25. The side of the yoke 25 facing away from the flow channel 8 is coupled with an insert 13 which is received in a membrane 12 by a material connection. The material connection between the insert 13 and the membrane 12 is herein produced by a vulcanization process, because the membrane 12 consists of an elastomer material with elastic properties. The insert 13, which is shaped like a plate and made of a soft-magnetic material, is together with the receiving membrane 12 inserted in an opening 9 of the housing 1, 2. To connect of the membrane 12 with the housing 1, 2, the membrane 12 is clamped between the inner part 2 and the outer part 1 of the housing 1, 2 which receives the inner part 2. Accordingly, the membrane 12 is clamped between the housing parts 1 and 2 in the marginal edge region 24 of the opening 9 of the housing 1, 2. This ensures that the chambers 5 and 6 and the flow channel 8 are sealed against the outside, preventing fluid from leaking from the elastomer bearing. A field return element 10 is disposed opposite the insert for keeping the magnetic field generated by the electromagnet 11 constant and closing the magnetic field. Several studs 14, 15, 16 and 17 are provided on the field return element 10 for improving the properties, in particular the uniformity of the magnetic field. In the illustrated example, the studs 14 to 17 produce a magnetic connection between the field return element 10 and the housing 1, 2 by directly resting against, i.e., contacting the housing 1, 2 in the marginal edge region 24 of the opening 9. In this way, a closed uniform magnetic field can be produced that evenly affects the flow channel 8. With this embodiment of the solution according to the invention, the properties of the magneto-rheological fluid in the flow channel 8 can be changed within very short time intervals. When a magnetic field is established, the soft-magnetic particles residing inside the magneto-rheological fluid connect with one another and thus close the flow channel 8. This process is referred to as "clustering." The entire elastomer bearing, implemented in the present example as a bush bearing, with its housing 1, 2 are inserted into a receiving opening 26 of an automobile component 22. The diagram in FIG. 1 corresponds to the cross-section taken along the line I-I of FIG. 2.

Figure 2:
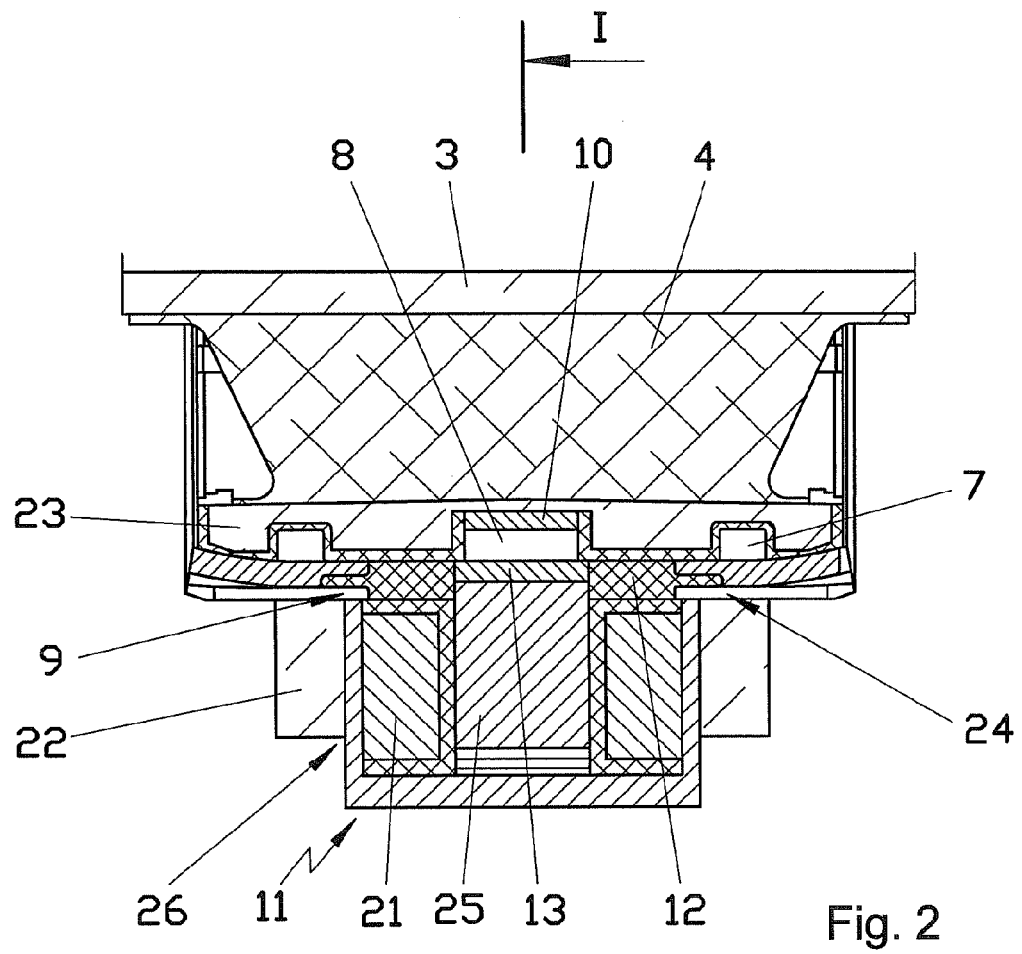

Conversely, a cross-section taken along the line II-II is indicated in FIG. 1 which refers to the view of the elastomer bearing with hydraulic damping illustrated in FIG. 2. The diagram of FIG. 2 shows the connecting element 3 of the elastomer bearing with hydraulic damping which is coupled to the housing 1, 2 via the elastomer body 4. The housing 1, 2 and the connecting element 3 are connected with the elastomer body 4 as a single piece by a vulcanization process. The electromagnet 11 is arranged outside the housing 1, 2 and includes, as is already described with reference to FIG. 1, on its yoke 25 an insert 13 made of a soft-magnetic material. The insert 13 is materially connected with the membrane 12 which in its marginal edge region 24 is clamped in the opening 9 of housing 1, 2, thereby sealing the elastomer bearing and/or the opening 9. An additional, always open damping channel 7 is disposed in a carrier 23 which receives the flow channel 8. This damping channel 7 connects the chambers 5 and 6, so that a defined fluid volume displaced in one chamber can be transferred to the respective other chamber via this flow channel 7, thereby providing damping operative in addition to the damping of the elastomer body. In the depicted exemplary embodiment, the flow channel 8 is configured as a bypass channel for the damping channel 7. The field return element 10 is disposed on the side of the flow channel 8 facing the insert 13. This provides the coupling already described in the context of FIG. 1, which produces a closed magnetic field. To this end, the field return element 10 has the studs 14 to 17.

Figure 3:
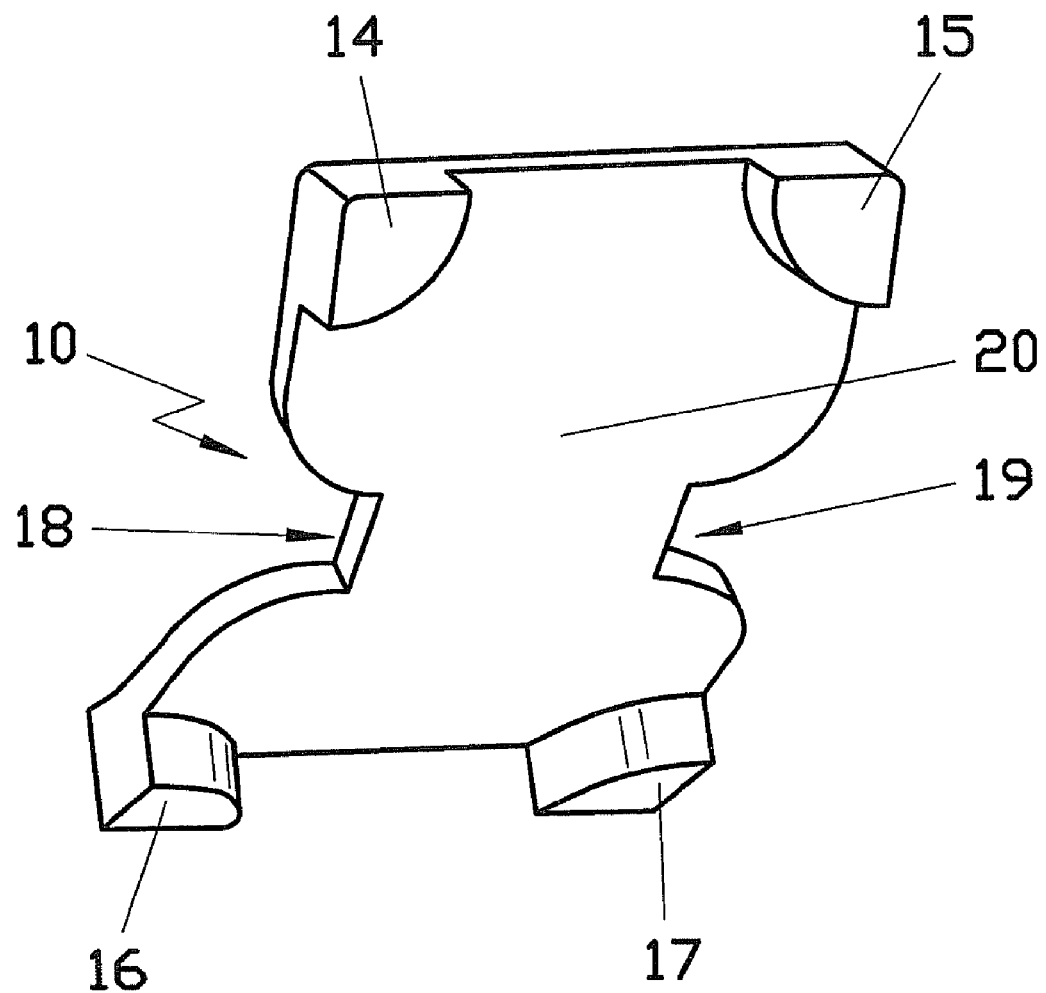

FIG. 3 shows in a perspective single-component view a field return element 10, which can be employed in an elastomer bearing with hydraulic damping according to the invention. The field return element 10 is composed of a surface 20 which matches the geometry of the elastomer bearing and is accordingly slightly curved. The surface 20 has at its marginal regions four studs 14, 15, 16 and 17. The field return element 10 depicted in FIG. 3 has constrictions in the form of recesses 18 and 19 and located approximately in the center region of surface 20.

Figure 4:
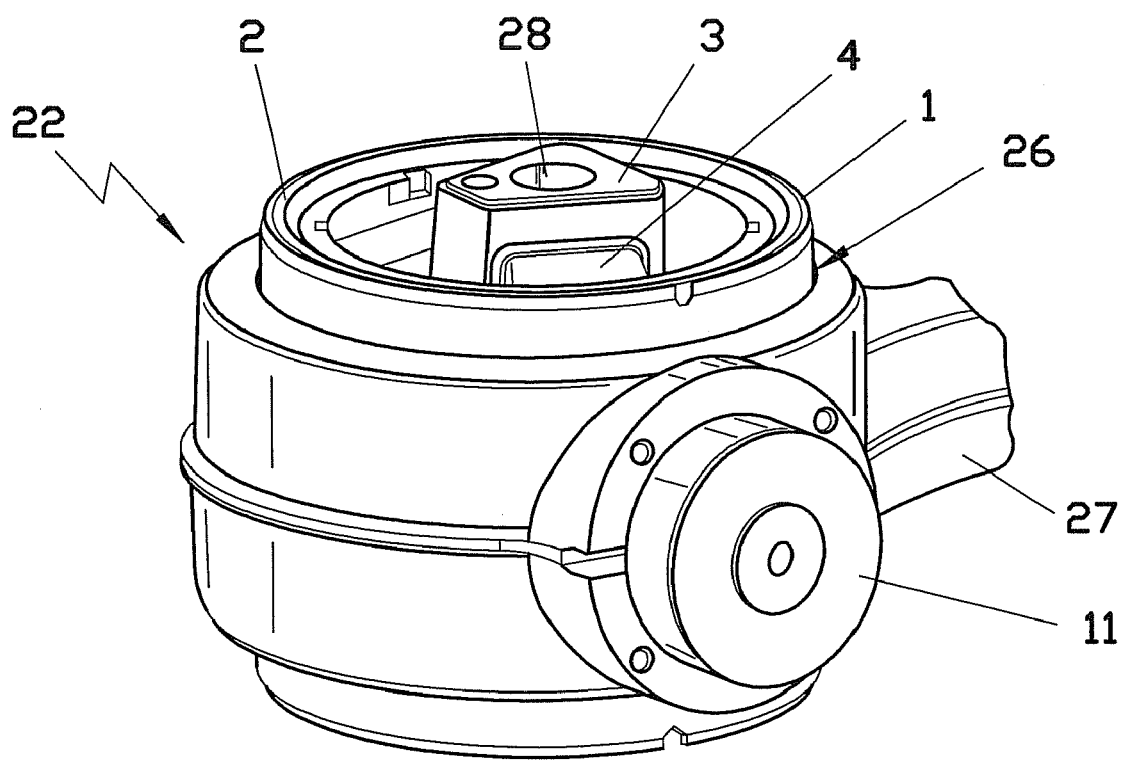

FIG. 4 shows the elastomer bearing with hydraulic damping of the invention as installed in an automobile component 22. The elastomer bearing which includes the housing parts 1 and 2 and the connecting element 3 has a through bore 28 adapted to receive a bolt for mounting the elastomer bearing together with the automobile component 22 receiving the elastomer bearing in the vehicle. As illustrated in the diagram of FIG. 4, the actuator 11 is implemented as an electromagnet and guided from the outside through the automobile component 22 for attachment to the housing 1, 2 of the elastomer bearing. As a result, the entire electromagnet 11 can be exchanged. A shank 27 of the automobile component 22 secures the automobile component 22 in the vehicle. The entire elastomer bearing is pressed into the receiving opening 26 of the automobile component.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An elastomer bearing with hydraulic damping, comprising:
   a housing,
   a connecting element,
   an elastomer body which couples the housing and the connecting element with one another for damping oscillations,
   two chamber filled with a magneto-rheological fluid,
   at least one flow channel which connects the chambers with one another for fluid conduction,
   an actuator associated with the flow channel and mounted on the outside of the housing for generating a magnetic field,
   wherein the flow channel includes a field return element interacting with the actuator.

2. The elastomer bearing of claim 1, wherein the field return element is inserted in the flow channel or forms a portion of the flow channel.

3. The elastomer bearing of claim 1, wherein the field return element includes at least one stud.

4. The elastomer bearing of claim 1, wherein the field return element has a surface with several studs.

5. The elastomer bearing of claim 1, wherein the housing has an opening in a region where the actuator is arranged.

6. The elastomer bearing of claim 5, wherein the field return element includes at least one stud, and wherein each stud contacts the housing in an edge region of the opening of the housing.

7. The elastomer bearing of claim 5, wherein the opening has a geometric dimension which is of the same size as or is greater than an outside dimension of an effective region of the actuator.

8. The elastomer bearing of claim 1, wherein the actuator is arranged at a location on the housing which is associated with the flow channel.

9. The elastomer bearing of claim 5, further comprising a membrane made of a non-magnetic material is inserted in the opening.

10. The elastomer bearing of claim 9, wherein the membrane is made of an elastomer material.

11. The elastomer bearing of claim 9, further comprising an insert embedded in the membrane.

12. The elastomer bearing of claim 11, wherein the insert is made of a magnetic material.

13. The elastomer bearing of claim 11, wherein the insert is shaped like a plate.

14. The elastomer bearing of claim 11, wherein the insert is connected with the membrane by a material connection.

15. The elastomer bearing of claim 14, wherein the insert and the membrane are glued together or are connected with one another by vulcanization.

16. The elastomer bearing of claim 10, wherein the elastomer membrane is connected with the housing by a material connection.

17. The elastomer bearing of claim 16, wherein the elastomer membrane is glued into the opening or connected with the housing by vulcanization.

18. The elastomer bearing of claim 10, wherein the elastomer membrane is non-positively connected with the housing.

19. The elastomer bearing of claim 18, wherein the housing comprises an exterior part and an interior part, and that the edge of the elastomer membrane is clamped between the inner part and the outer part.

20. The elastomer bearing of claim 1, wherein the actuator comprises an electromagnet.

21. The elastomer bearing of claim 1, wherein the actuator comprises a magnetic clamp.

22. The elastomer bearing of claim 20, wherein the housing has an opening in a region where the actuator is arranged, a membrane having an embedded non-magnetic insert is inserted in the opening, and the electromagnet comprises a yoke that is coupled with the insert.

23. The elastomer bearing of claim 1, further comprising at least one open damping channel which connects the two chambers for fluid conduction, wherein the flow channel is configured as a bypass channel for the at least one damping channel.

24. The elastomer bearing of claim 23, wherein the at least one damping channel has a smaller cross-section and a greater length than the flow channel.

25. The elastomer bearing of claim 1, wherein the elastomer bearing is formed as a bush bearing.

26. The elastomer bearing of claim 1, wherein the housing of the elastomer bearing is inserted into a corresponding receiving opening of an automobile component.

27. The elastomer bearing of claim 1, wherein the field return element guides the magnetic field and minimizes magnetic resistance.

28. The elastomer bearing of claim 3, wherein the stud represents a coupling for orienting the magnetic field so as to prevent magnetic leakage.

* * * * *